(12) United States Patent
Meng et al.

(10) Patent No.: US 11,919,453 B2
(45) Date of Patent: Mar. 5, 2024

(54) VEHICLE POSITIONING DEVICE FOR VEHICLE VISION CALIBRATION, AND POSITIONING ADJUSTMENT METHOD AND SYSTEM

(71) Applicant: Beijing Smarter Eye Technology Co. Ltd., Beijing (CN)

(72) Inventors: Ran Meng, Beijing (CN); Hua Chai, Beijing (CN); Yanqiu Xia, Beijing (CN); Zunying Pang, Beijing (CN); Zhe Wang, Beijing (CN); Yong Jia, Beijing (CN); Hui Cai, Beijing (CN); Chuanbin Feng, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 471 days.

(21) Appl. No.: 17/176,392

(22) Filed: Feb. 16, 2021

(65) Prior Publication Data
US 2022/0080901 A1    Mar. 17, 2022

(30) Foreign Application Priority Data
Sep. 17, 2020 (CN) .......................... 202010980291.0

(51) Int. Cl.
| G06T 7/10 | (2017.01) |
| B60R 11/04 | (2006.01) |
| B60S 5/00 | (2006.01) |
| B60S 13/02 | (2006.01) |
| B66F 7/10 | (2006.01) |
| E04H 6/12 | (2006.01) |
| G06T 7/80 | (2017.01) |
| G06V 20/56 | (2022.01) |
| B60R 11/00 | (2006.01) |

(52) U.S. Cl.
CPC ................. *B60R 11/04* (2013.01); *B60S 5/00* (2013.01); *B60S 13/02* (2013.01); *B66F 7/10* (2013.01); *E04H 6/12* (2013.01); *G06T 7/80* (2017.01); *G06V 20/56* (2022.01); *B60R 2011/008* (2013.01); *G06T 2207/30252* (2013.01)

(58) Field of Classification Search
None
See application file for complete search history.

(56) References Cited

U.S. PATENT DOCUMENTS

2019/0204427 A1* 7/2019 Abari .................. G01S 17/86
2021/0051317 A1* 2/2021 Yan .......................... G06T 7/80

* cited by examiner

*Primary Examiner* — Samuel D Fereja
(74) *Attorney, Agent, or Firm* — NKL Law; Allen Xue

(57) ABSTRACT

The present disclosure provides a vehicle positioning device for vehicle vision calibration, a positioning adjustment method, and a positioning adjustment system. The vehicle positioning device includes a base, a chassis, a translation mechanism and a rotation mechanism. A to-be-calibrated vehicle is placed onto the chassis, and the chassis is provided with a stopper. The translation mechanism is arranged between the chassis and the base, and configured to drive the chassis to move in an X-axis direction in a three-dimensional coordinate system relative to the base in accordance with a translation control instruction. The rotation mechanism is arranged between the chassis and the base, and configured to drive the chassis to rotate about a Z-axis in the three-dimensional coordinate system relative to the base in accordance with a rotation control instruction.

8 Claims, 6 Drawing Sheets

S1 — acquiring the quantity of shielded first through-beam sensors in a first through-beam sensor array and a group to which each shielded first through-beam sensor belongs when a vehicle is in an ideal state, generating a predetermined detection value in a width direction, acquiring the quantity of shielded second through-beam sensors in a second through-beam sensor array and a group to which each shielded second through-beam sensor belongs when the vehicle is in the ideal state, and generating a predetermined detection value in a length direction S2 — acquiring the quantity of shielded first through-beam sensors in the first through-beam sensor array and a group to which each shielded first through-beam sensor belongs for a current vehicle in the width direction, generating a detection value of the current vehicle in the width direction, acquiring the quantity of shielded second through-beam sensors in the second through-beam sensor array and a group to which each shielded second through-beam sensor belongs for the current vehicle in the length direction, and generating a detection value of the current vehicle in the length direction S3 — generating a rotation control instruction in accordance with a difference between the detection value of the current vehicle in the width direction and the predetermined detection value in the width direction as well as a difference between the detection value of the current vehicle in the length direction and the predetermined detection value in the length direction

FIG. 7

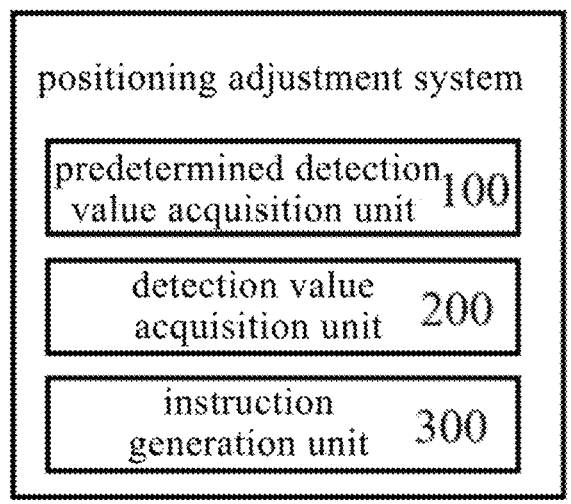

FIG. 8

VEHICLE POSITIONING DEVICE FOR VEHICLE VISION CALIBRATION, AND POSITIONING ADJUSTMENT METHOD AND SYSTEM

CROSS-REFERENCES TO RELATED APPLICATIONS

This application claims priority to and the benefit of Chinese Patent Application No. 2020109802910, filed on Sep. 17, 2020, the disclosure of which is incorporated herein by reference in its entirety.

TECHNICAL FIELD

The present disclosure relates to the field of the calibration of a vehicle vision system, in particular to a vehicle positioning device for vehicle vision calibration, a positioning adjustment method, and a positioning adjustment system.

BACKGROUND

Along with the development of through-beam sensor technology and machine vision technology, such intelligent vehicle-mounted vision systems as autonomous driving, aided driving, 360° all-around looking and aided road-merging have been widely used. During the assembly, these vision systems need to be calibrated, so as to determine a position of a coordinate system of the vision system relative to a coordinate system of a vehicle body. Usually, the calibration of the vision system is achieved through photographing calibration plates or targets (e.g., a checkerboards) surrounding the vehicle body in a calibration workshop. However, when a vehicle moves into a calibration zone, it is impossible to ensure a same parking position and a same parking angle of the vehicle each time, i.e., the vehicle is parked at a random position and a random angle. Due to the inconsistency in the parking position and course angle, the relative position between the vehicle and the calibration plate or target as a reference may be difference, and thereby the calibration accuracy may be adversely affected.

SUMMARY

An object of the present disclosure is to provide a vehicle positioning device for vehicle vision calibration, a positioning adjustment method, and a positioning adjustment system, so as to at least partially solve the problem in the related art where the calibration accuracy is relatively low due to the inconsistency in the parking position and course angle.

In one aspect, the present disclosure provides in some embodiments a vehicle positioning device for vehicle vision calibration, including: a base; a chassis on which a to-be-calibrated vehicle is placed and which is provided with a stopper configured to limit movement of the to-be-calibrated vehicle along a Y-axis direction in a three-dimensional coordinate system; a translation mechanism arranged between the chassis and the base and configured to drive the chassis to move along an X-axis direction in the three-dimensional coordinate system relative to the base in accordance with a translation control instruction; and a rotation mechanism arranged between the chassis and the base and configured to drive the chassis to rotate about a Z-axis in the three-dimensional coordinate system relative to the base in accordance with a rotation control instruction.

In a possible embodiment of the present disclosure, the stopper is a limitation bar parallel to the X-axis direction.

In a possible embodiment of the present disclosure, the rotation mechanism includes: a rotary table, the translation mechanism being in transmission connection with the rotary table and configured to drive the chassis to rotate with the rotary table; a rotation stepping motor arranged between the rotary table and the base and configured to drive the rotary table to rotate the Z-axis in the three-dimensional coordinate system relative to the base in accordance with the rotation control instruction; and a spherical bearing rotatably mounted between the rotary table and the base and in transmission connection with the rotation stepping motor.

In a possible embodiment of the present disclosure, the vehicle positioning device further includes a lifting mechanism arranged between the rotary table and the translation mechanism, and the translation mechanism is in transmission connection with the rotary table through the lifting mechanism. The lifting mechanism includes: a lifting table on which the translation mechanism is mounted; and a telescopic cylinder, one end of which is fixed to the lifting table, and the other end of which is fixed to the rotary table.

In a possible embodiment of the present disclosure, the translation mechanism includes: a bracket mounted on the lifting table; a screw rod, an axis of which is arranged along the X-axis direction and which is rotatably mounted on the bracket and driven by the rotatory stepping motor to rotate about its axis; and a nut in engagement with the screw rod and fixedly connected to the chassis.

In a possible embodiment of the present disclosure, the translation mechanism further includes: a straight guide rail arranged in the X-axis direction and fixed to the lifting table; and a slider slidably mounted on the straight guide rail in the X-axis direction and fixedly connected to the chassis.

In a possible embodiment of the present disclosure, the vehicle positioning device further includes: a first through-beam sensor array including two groups of first through-beam sensors arranged opposite to each other at two sides of the chassis in the X-axis direction respectively, each group including a plurality of first through-beam sensors; a second through-beam sensor array including two groups of second through-beam sensors arranged opposite to each other at two sides of the chassis in the Y-axis direction respectively, each group including a plurality of second through-beam sensors; and a general control unit configured to generate the translation control instruction in accordance with a shielding state of the first through-beam sensor array and generate the rotation control instruction in accordance with the shielding state of the first through-beam sensor array and a shielding state of the second through-beam sensor array.

In another aspect, the present disclosure provides in some embodiments a positioning adjustment method, including: acquiring the quantity of shielded first through-beam sensors in a first through-beam sensor array and a group to which each shielded first through-beam sensor belongs when a vehicle is in an ideal state, and generating a predetermined detection value in a width direction; acquiring the quantity of shielded second through-beam sensors in a second through-beam sensor array and a group to which each shielded second through-beam sensor belongs when the vehicle is in the ideal state, and generating a predetermined detection value in a length direction; acquiring the quantity of shielded first through-beam sensors in the first through-beam sensor array and a group to which each shielded first through-beam sensor belongs for a current vehicle in the width direction, and generating a detection value of the current vehicle in the width direction; acquiring the quantity of shielded second through-beam sensors in the second through-beam sensor array and a group to which each shielded second through-beam sensor belongs for the current vehicle in the length direction, and generating a detection value of the current vehicle in the length direction; and generating a rotation control instruction in accordance with a difference between the detection value of the current vehicle in the width direction and the predetermined detection value in the width direction as well as a difference between the detection value of the current vehicle in the length direction and the predetermined detection value in the length direction.

In a possible embodiment of the present disclosure, the positioning adjustment method further includes generating a translation control instruction in accordance with the difference between the detection value of the current vehicle in the width direction and the predetermined detection value in the width direction.

In yet another aspect, the present disclosure provides in some embodiments a positioning adjustment system, including: a predetermined detection value acquisition unit configured to acquire the quantity of shielded first through-beam sensors in a first through-beam sensor array and a group to which each shielded first through-beam sensor belongs when a vehicle is in an ideal state, generate a predetermined detection value in a width direction, acquire the quantity of shielded second through-beam sensors in a second through-beam sensor array and a group to which each shielded second through-beam sensor belongs when the vehicle is in the ideal state, and generate a predetermined detection value in a length direction; a detection value acquisition unit configured to acquire the quantity of shielded first through-beam sensors in the first through-beam sensor array and a group to which each shielded first through-beam sensor belongs for a current vehicle in the width direction, generate a detection value of the current vehicle in the width direction, acquire the quantity of shielded second through-beam sensors in the second through-beam sensor array and a group to which each shielded second through-beam sensor belongs for the current vehicle in the length direction, and generate a detection value of the current vehicle in the length direction; and an instruction generation unit configured to generate a translation control instruction in accordance with a difference between the detection value of the current vehicle in the width direction and the predetermined detection value in the width direction, and generate a rotation control instruction in accordance with the difference between the detection value of the current vehicle in the width direction and the predetermined detection value in the width direction as well as a difference between the detection value of the current vehicle in the length direction and the predetermined detection value in the length direction.

The vehicle positioning device for vehicle vision calibration in the embodiments of the present disclosure may include the base, the chassis, the translation mechanism and the rotation mechanism. The to-be-calibrated vehicle may be placed onto the chassis, and the chassis may be provided with the stopper for limiting the movement of the to-be-calibrated vehicle along the Y-axis direction in the three-dimensional coordinate system, so as to position the vehicle in the Y-axis direction. The translation mechanism may be arranged between the chassis and the base, and configured to drive the chassis to move along the X-axis direction in the three-dimensional coordinate system relative to the base in accordance with the translation control instruction. During the calibration, when the vehicle has been placed onto the chassis and the vehicle is offset in the X-axis direction, the translation mechanism may receive the corresponding control instruction and drive the chassis and the vehicle on the chassis to be translated by a predetermined distance in a predetermined direction, so as to translate the vehicle to an ideal position in the width direction. The rotation mechanism may be arranged between the chassis and the base and drive the chassis to rotate about the Z-axis in the three-dimensional coordinate system relative to the base in accordance with the rotation control instruction. During the calibration, when the vehicle has been placed onto the chassis and a course angle of the vehicle is offset, the rotation mechanism may receive the corresponding control instruction and drive the chassis and the vehicle on the chassis to rotate by a predetermined angle in a predetermined direction, so as to rotate the vehicle to an ideal angular position. As a result, through the translation mechanism and the rotation mechanism, it is able to maintain the vehicle at a same position and a same course angle before the calibration, thereby to solve the problem in the related art where the calibration accuracy is relatively low due to the inconsistency in the parking position and course angle.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

FIG. 7 is a flow chart of a positioning adjustment method according to one embodiment of the present disclosure; and FIG. 8 is a block diagram of a positioning adjustment system according to one embodiment of the present disclosure.

Figure 1:
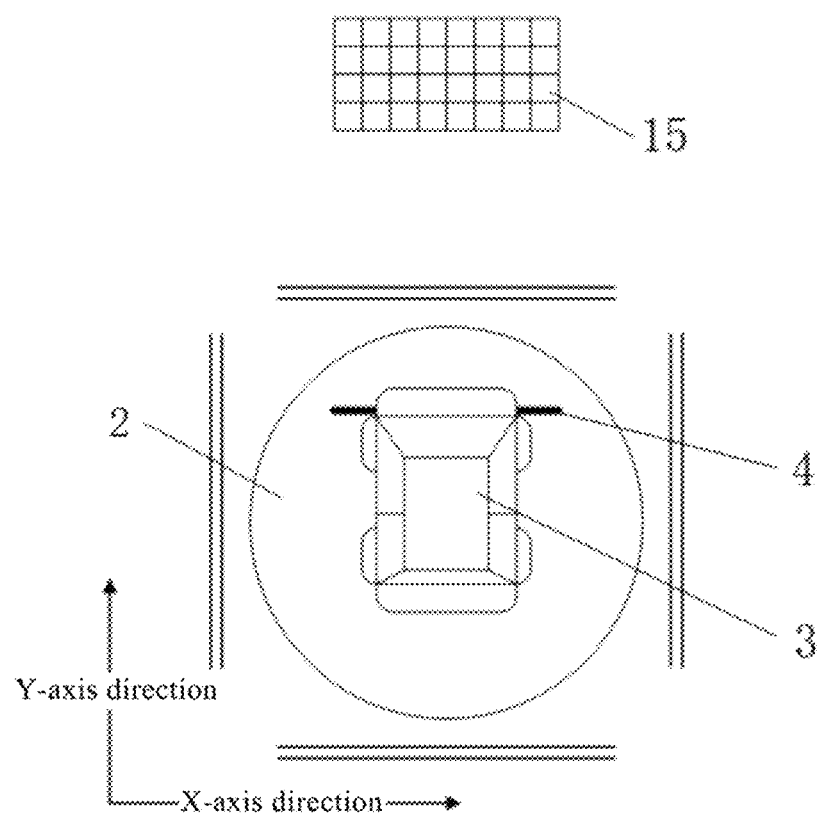
FIG. 1 is a schematic view showing a vehicle vision calibration system where a vehicle positioning device is located according to one embodiment of the present disclosure.

REFERENCE SIGNS LIST 1 base
2 chassis 3 to-be-calibrated vehicle
4 limitation bar
5 rotary table
6 spherical bearing
7 lifting table
8 telescopic cylinder
9 bracket
10 screw rod
11 nut
12 stepping motor
13 straight guide rail
14 slider
15 calibration plate

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

A vehicle positioning device provided in the embodiments of the present disclosure may be used for vehicle vision calibration. During the calibration of a vehicle, usually the calibration of a vision system is performed through photographing calibration plates or targets 15 (e.g., a checkerboards) surrounding the vehicle body in a calibration workshop. At this time, it is necessary to, during the calibration, automatically adjust a position and a course angle of the vehicle body, thereby to ensure the consistency in the position and the course angle for different vehicles before the calibration.

Figure 2:
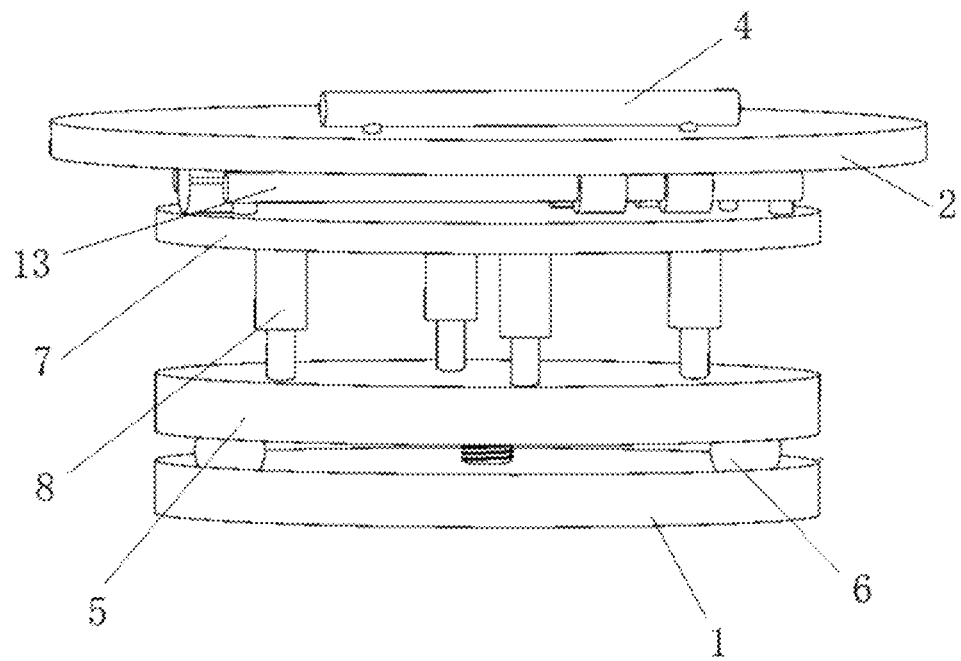
FIG. 2 is a schematic view showing the vehicle positioning device according to one embodiment of the present disclosure.

The present disclosure provides in some embodiments a vehicle positioning device, which includes a base 1, a chassis 2, a translation mechanism and a rotation mechanism. As a support of the vehicle positioning device, the base 1 may be mounted at a bottom of a groove in a calibration workshop. A to-be-calibrated vehicle 3 may be placed onto the chassis 2, and the chassis 2 may be provided with a stopper for limiting movement of the to-be-calibrated vehicle 3 along a Y-axis direction in a three-dimensional coordinate system. To be specific, as shown in FIG. 2, the stopper may be a limitation bar 3 arranged parallel to an X-axis. Theoretically, the stopper may also be a limitation line. The limitation bar 4 may be used to initially define a position of the vehicle in the Y-axis direction.

The chassis 2 may be a circular disc, and a plurality of groups of through-beam sensor arrays may surround the circular disc. A direction and a position of the vehicle to be adjusted may be determined in accordance with the through-beam sensor arrays, so as to generate a corresponding control instruction. Theoretically, any other sensors may also be used to detect the position and generate the control instruction. For example, a position sensor may be used to acquire a current position of the vehicle, then the current position may be compared with an ideal position, and then the control instruction may be generated in accordance with a difference between the current position and the ideal position. For another example, an image collection device may be used to acquire the current position of the vehicle, and then the corresponding control instruction may be generated through comparing the current position with the ideal position.

The translation mechanism may be arranged between the chassis 2 and the base 1, and drive the chassis 2 to move along an X-axis direction in the three-dimensional coordinate system relative to the base 1 in accordance with a translation control instruction. The rotation mechanism may be arranged between the chassis 2 and the base 1, and drive the chassis 2 to rotate about a Z-axis in the three-dimensional coordinate system relative to the base 1 in accordance with a rotation control instruction. During the operation, FIG. 1 shows a relationship among the X-axis direction, a Y-axis direction, the chassis 2 and the vehicle. Depending on different calibration purposes, a calibration plate or target 15 in a specific form may be arranged adjacent to the chassis 2 and maintained at a specific position relative to the chassis 2, so as to facilitate the calibration of a vision system on a vehicle body.

To be specific, with reference to FIG. 2 again, the rotation mechanism may include a rotary table 5, a rotation stepping motor, and a spherical bearing 6 for supporting and rotating. The rotation stepping motor may be arranged between the rotary stable 5 and the base 1, and configured to drive the rotary table 5 to rotate about the Z-axis in the three-dimensional coordinate system relative to the base 1 in accordance with the rotation control instruction. The spherical bearing 6 may be rotatably mounted between the rotary table 5 and the base 1, and in transmission connection with the rotation stepping motor. Theoretically, a rotation cylinder may also be used. In order to drive the translation mechanism and the chassis 2 on the translation mechanism (thereby to drive the vehicle on the chassis 2 to rotate), the translation mechanism may be in transmission connection with the rotary table 5, so as to drive the chassis 2 to rotate with the rotary table 5. The rotation cylinder may be arranged between the rotary table 5 and the base 1, so as to drive the rotary table 5 to rotate about the Z-axis in the three-dimensional coordinate system relative to the base 1 in accordance with the rotation control instruction.

The rotation mechanism is provided so as to adjust a course angle of the vehicle. The rotation mechanism may be arranged at the bottom of the vehicle positioning device and directly mounted on the base 1. The rotation mechanism may drive a lifting mechanism, the translation mechanism and the chassis 2 to rotate as a whole in accordance with an instruction from the through-beam sensor arrays, thereby to adjust the course angle of the vehicle body, and finally enable an angle between a length direction of the vehicle body and the Y-axis direction (i.e., the course angle) to be zero or approximate to zero.

As shown in FIG. 2, the vehicle positioning device may further include a lifting mechanism arranged between the rotary table 5 and the translation mechanism. The translation mechanism may be in transmission connection with the rotary table 5 through the lifting mechanism. The lifting mechanism may include a lifting table 7 and a telescopic cylinder 8. The translation mechanism may be arranged on the lifting table 7. One end of the telescopic cylinder 8 may be fixed to the lifting table 7, and the other end may be fixed to the rotary table.

An upper surface of the lifting table 7 may be connected to the translation mechanism, so as to drive the translation mechanism, the chassis 2 and the to-be-calibrated vehicle 3 to move up and down as a whole. Before or after the calibration, the lifting mechanism needs to move up or down, so as to ensure that the chassis 2 is at a same level with the ground, thereby to enable the vehicle to move into or out of the chassis 2 conveniently. When the vehicle moves into the chassis 2 and stays stable, the lifting mechanism needs to move up to a certain level, so that the chassis 2 may not be in contact with the ground during the translation in the X-axis direction. After the calibration, the lifting mechanism needs to move down to its original position.

Figure 3:
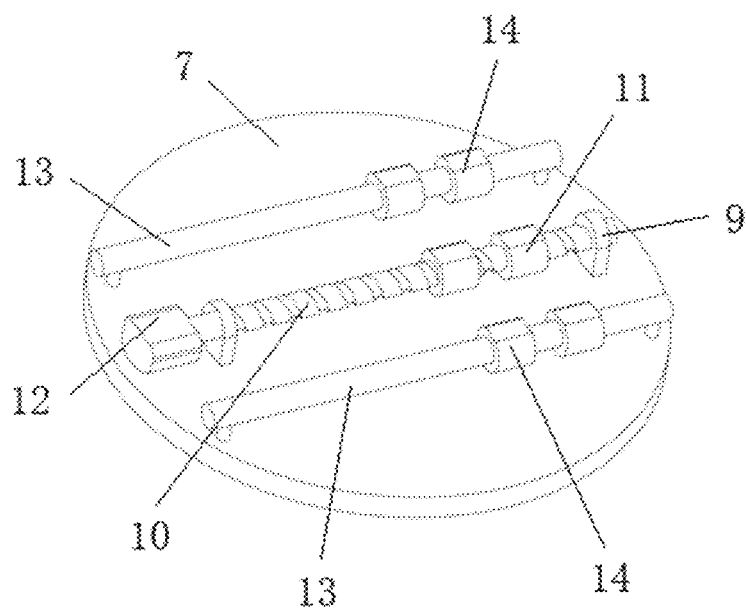
FIG. 3 is a schematic view showing a translation mechanism in the vehicle positioning device according to one embodiment of the present disclosure.

With reference to FIG. 2 in conjunction with FIG. 3, specifically, the translation mechanism may include a bracket 9, a screw rod 10 and a nut 11. The bracket 9 may be mounted on the lifting table 7 for the installation of the screw rod 10. Two groups of brackets 9 may be provided and separated from each other, so as to improve the stability of the screw rod 10. Two ends of the screw rod 1 may be rotatably arranged in installation holes of the brackets 9 through bearings. An axis of the screw rod 10 may be arranged along the X-axis direction. The screw rod 10 may be rotatably mounted into the bracket 9, and may be driven by the rotation stepping motor 12 to rotate about its axis. The nut 11 may be in engagement with the screw rod 10, and the chassis 2 may be fixedly connected to the nut 11. The rotation stepping motor 12 may be connected to the screw rod 10, and the bracket 9 may support and fix the screw rod 10 at the two ends of the screw rod 10. The rotation stepping motor 12 may adjust a rotation direction and a rotation angle in accordance with the translation control instruction from the through-beam sensor arrays, and thereby drive the chassis 2 and the vehicle on the chassis 2 to be translated to the left or right by a predetermined distance.

In order to facilitate the translation, the translation mechanism may further include a straight guide rail 13 and a slider 1 4. The straight guide rail 13 may be arranged along the X-axis, and fixed to the lifting table 7. The slider 14 may be slidably mounted on the straight guide rail 13 in the X-axis direction, and the chassis 2 may be fixedly connected to the slider 14. In other words, in order to ensure uniform pressure and improve the movement accuracy, the translation mechanism may include two straight guide rails 13 arranged parallel to each other and one screw rod 10. The two straight guide rails 13 may be arranged at two sides of the screw rod 10 respectively, and arranged symmetrically relative to the screw rod 10. The straight guide rails 13 and the screw rod 10 may be arranged parallel to the X-axis direction. The straight guide rails 13, the rotation stepping motor 12 and the bracket 9 may be fixed to the underneath lifting table 7, and the slider 14 and the nut 11 may be fixed to a bottom of the chassis 2. The slider 14 may be slidably connected to the straight guide rails 13 to support the chassis 2 and guide the translation of the chassis 2. The screw rod 10 may be in engagement with the nut 11, so as to convert the rotation movement of the screw rod 10 into the straight movement of the nut 11, thereby to drive the entire chassis 2 to be translated along the straight guide rail 13 (i.e., the X-axis direction).

Figure 4:
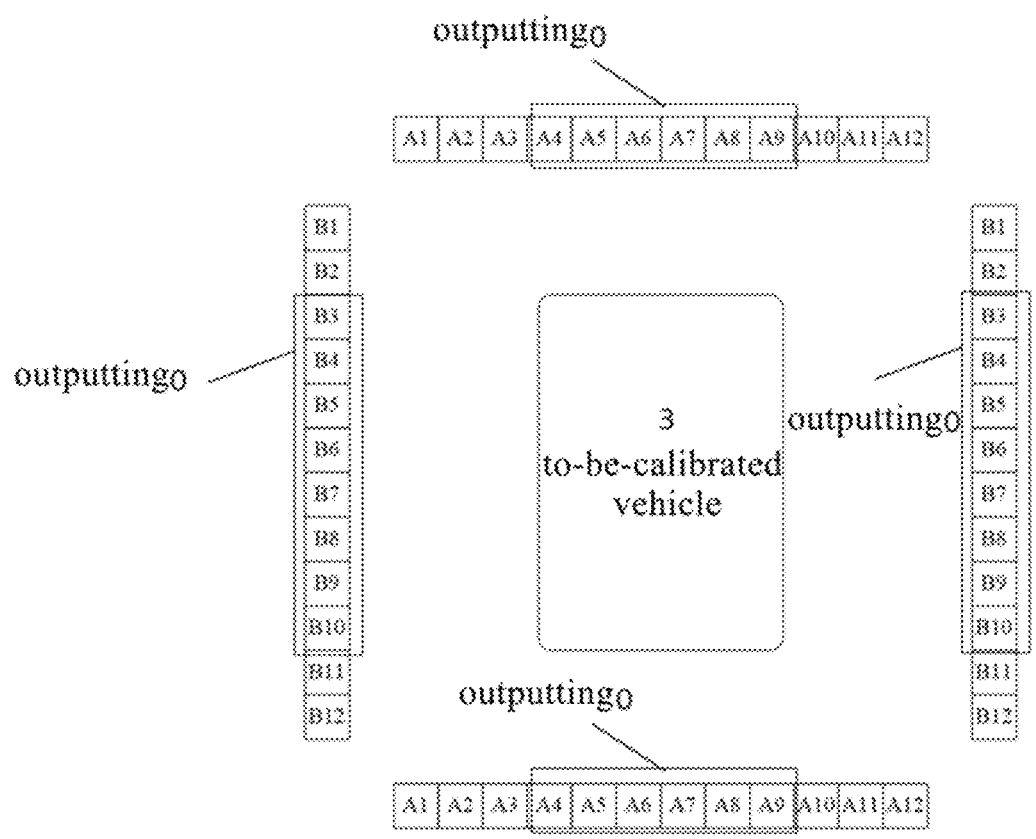
FIG. 4 is a schematic view showing output values of through-beam sensors when a vehicle is in an ideal position.
Figure 5:
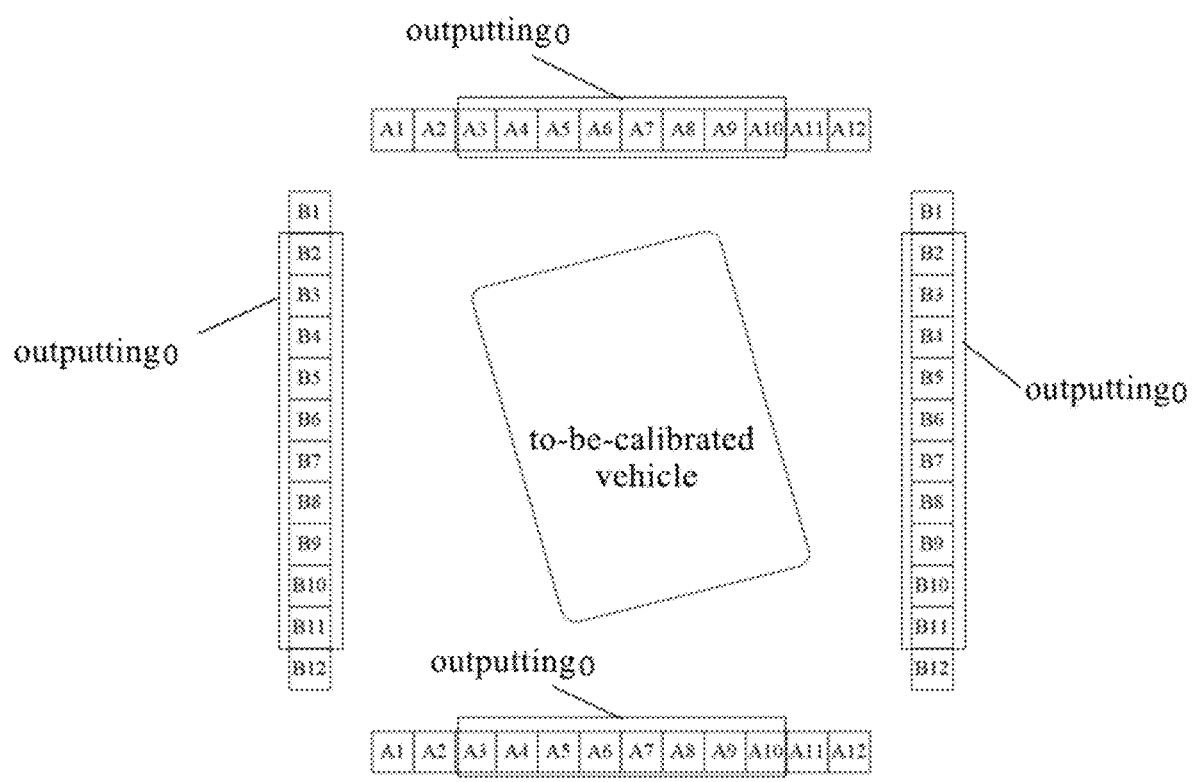
FIG. 5 is a schematic view showing the output values of the through-beam sensors when a course angle of the vehicle has not been adjusted yet.
Figure 6:
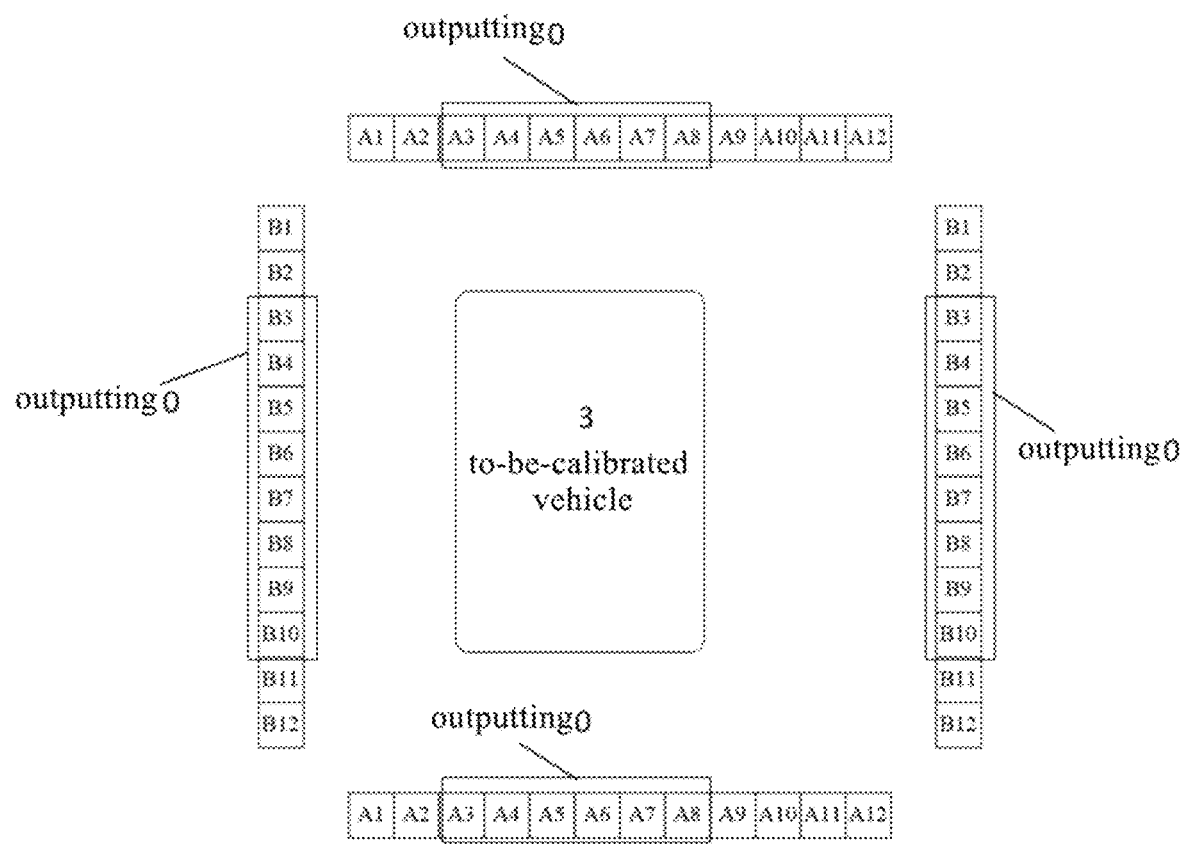
FIG. 6 is a schematic view showing the output values of the through-beam sensors when a position of the vehicle in an X-axis direction has not been adjusted yet.

In the embodiments of the present disclosure, the through-beam sensor arrays may be used to collect the position of the vehicle and generate the corresponding control instruction, so as to improve the control accuracy and reduce the complexity in a control policy. To be specific, as shown in FIGS. 4 to 6, the vehicle positioning device may further include a first through-beam sensor array, a second through-beam sensor array, and a general control unit. The first through-beam sensor array may include two groups of first through-beam sensors arranged opposite to each other at two sides of the chassis 2 in the X-axis direction respectively, and each group may include a plurality of first through-beam sensors. The second through-beam sensor array may include two groups of second through-beam sensors arranged opposite to each other at two sides of the chassis 2 in the Y-axis direction respectively, and each group may include a plurality of second through-beam sensors. The general control unit is configured to generate the translation control instruction in accordance with a shielding state of the first through-beam sensor array and generate the rotation control instruction in accordance with the shielding state of the first through-beam sensor array and a shielding state of the second through-beam sensor array.

Taking scenarios in FIGS. 4 to 6 as an example, two groups of through-beam sensor arrays may surround the circular chassis 2. The first through-beam sensor array A may be arranged parallel to the X-axis direction, and the second through-beam sensor array B may be arranged parallel to the Y-axis direction. The array A may be arranged in such a manner as to cover a width of the to-be-calibrated vehicle, and the array B may be arranged in such a manner as to cover a length of the to-be-calibrated vehicle. Each group of sensor arrays may include a plurality of through-beam sensors A1, A2, . . . , AN or B1, B2, . . . , BN. When no vehicle is placed onto the chassis, each sensor in the through-beam sensor array may be in a non-shielding state and it may output a value of 1 for ease of description, and each sensor in the through-beam sensor array may be in the shielding state and it may output a value of 0 for ease of description.

FIGS. 4, 5 and 6 show the output values of the sensor array A and the sensor array B when the vehicle is at the ideal position, the course angle of the vehicle has not been adjusted yet, and the position of the vehicle in the X-axis direction has not been adjusted yet respectively, so as to show the influence of the position of the vehicle on the output values of the sensor arrays. The output value of each sensor outside a box may be 1, and the output value of each sensor inside the box may be 0. When the vehicle is at the ideal position (e.g., as shown in FIG. 4), A4 to A9 may each output a value of 0, and B3 to B10 may each output a value of 0. At this time, the quantity of the sensors in the array A which output the value of 0 may be 6, and the quantity of the sensors in the array B which output the value of 0 may be 8. When the vehicle is at any random position where the course angle has not be adjusted yet (e.g., as shown in FIG. 5), A3 to A10 may each output a value of 0, and B2 to B11 may each output a value of 0. At this time, the quantity of the sensors in the array A which output the value of 0 may be 8, and the quantity of the sensors in the array B which output the value of 0 may be 10, i.e., both of them are greater than the quantity of the sensors which output the value of 0 when the vehicle is at the ideal position. When the position of the vehicle in the X-axis direction has not been adjusted yet (e.g., as shown in FIG. 5), A3 to A8 may each output a value of 0, and B3 to B10 may each output a value of 0. At this time, the quantity of the sensors in the array A which output the value of 0 may be 6, and the quantity of the sensors in the array B which output the value of 0 may be 8. As compared with the states of the sensors when the vehicle is at the ideal position, serial numbers of the sensors in the array A which output the value of 0 have changed. Through analyzing output signals from each sensor in the array, it is able to determine whether an angle between the length direction of the vehicle body and the Y-axis direction (i.e., the course angle) is 0 (or an extremely small value) and determine a position of the vehicle body in the X-axis direction, thereby to provide accurate instructions to the rotation mechanism and the translation mechanism.

It should be appreciated that, the above description is merely for illustrative purposes, and in actual use, more sensors may be provided and a distance between the adjacent sensors may be smaller, so as to detect the position and the course angle of the to-be-calibrated vehicle in a more accurate manner.

During the operation, when calibrating the vehicle, the upper surface of the chassis 2 may be flush with the ground. At first, the vehicle needs to move to the chassis 2 and stay stable on the upper surface of the chassis 2, with two front wheels being in contact with the limitation bar 4. The two front wheels may be in contact with the limitation bars 4 at different degrees. At this time, the angle between the length direction of the vehicle body and the Y-axis direction (i.e., the course angle) may not be 0. Usually, there may exist a random angle between the length direction of the vehicle body and the Y-axis direction, and it is necessary to adjust the course angle. In addition, there may also exist an offset between the position of the vehicle body in the X-axis direction and the ideal position, and it is necessary to translate the vehicle in the X-axis direction. The translation mechanism may be arranged under the chassis, and a bottom of the circular chassis 2 may be connected to the translation mechanism, so that the entire circular chassis 2 may be translated from left to right or from right to left in the X-axis direction along with the translation mechanism. The translation mechanism may be connected to the lifting mechanism thereunder, so that the circular chassis 2 and the translation mechanism may move up and down along with the lifting mechanism. The rotation mechanism may be arranged under the lifting mechanism, and the circular chassis 2, the translation mechanism and the lifting mechanism may be rotated along with the rotation mechanism. During the calibration of different vehicles, when the position of the vehicle has been limited in the Y-axis direction, the position of the vehicle has been adjusted in the X-axis direction and the course angle of the vehicle has been adjusted through an autonomous vehicle positioning system, the position of each vehicle relative to the calibration plate or target 15 may remain unchanged (or may be controlled within a relatively small error range). It should be appreciated that, during the position adjustment, the course angle may be adjusted at first, and then the position of the vehicle in the X-direction may be adjusted in accordance with the results from the first through-beam sensor array. In other words, during the operation, a course angle adjustment instruction (i.e., the rotation control instruction) may be acquired through the two groups of sensor arrays, and after the course angle has been adjusted, whether there is an offset for the position of the vehicle in the X-axis direction may be determined through the first through-beam sensor array. When there is the offset, the translation control instruction may be generated.

According to the embodiments of the present disclosure, the vehicle positioning device for vehicle vision calibration may include the base 1, the chassis 2, the translation mechanism and the rotation mechanism. The to-be-calibrated vehicle 3 may be placed onto the chassis 2, and the chassis 2 may be provided with the stopper for limiting the movement of the to-be-calibrated vehicle 3 along the Y-axis direction in the three-dimensional coordinate system, so as to position the vehicle in the Y-axis direction. The rotation mechanism may be arranged between the chassis 2 and the base 1 and drive the chassis 2 to rotate about the Z-axis in the three-dimensional coordinate system relative to the base 1 in accordance with the rotation control instruction. During the calibration, when the vehicle has been placed onto the chassis 2 and the course angle of the vehicle is offset, the rotation mechanism may receive the corresponding control instruction and drive the chassis 2 and the vehicle on the chassis 2 to rotate by a predetermined angle in a predetermined direction, so as to rotate the vehicle to an ideal angular position. The translation mechanism may be arranged between the chassis 2 and the base 1, and configured to drive the chassis 2 to move along the X-axis direction in the three-dimensional coordinate system relative to the base 1 in accordance with the translation control instruction. During the calibration, when the vehicle has been placed onto the chassis 2 and the vehicle is offset in the X-axis direction, the translation mechanism may receive the corresponding control instruction and drive the chassis 2 and the vehicle on the chassis 2 to be translated by a predetermined distance in a predetermined direction, so as to translate the vehicle to the ideal position in the width direction. As a result, through the translation mechanism and the rotation mechanism, it is able to maintain the vehicle at a same position and a same course angle before the calibration, thereby to solve the problem in the related art where the calibration accuracy is relatively low due to the inconsistency in the parking position and course angle.

The present disclosure further provides in some embodiments a positioning adjustment method for the above-mentioned vehicle positioning device which, as shown in FIG. 7, includes: S1 of acquiring the quantity of shielded first through-beam sensors in a first through-beam sensor array and a group to which each shielded first through-beam sensor belongs when a vehicle is in an ideal state, generating a predetermined detection value in a width direction, acquiring the quantity of shielded second through-beam sensors in a second through-beam sensor array and a group to which each shielded second through-beam sensor belongs when the vehicle is in the ideal state, and generating a predetermined detection value in a length direction; S2 of acquiring the quantity of shielded first through-beam sensors in the first through-beam sensor array and a group to which each shielded first through-beam sensor belongs for a current vehicle in the width direction, generating a detection value of the current vehicle in the width direction, acquiring the quantity of shielded second through-beam sensors in the second through-beam sensor array and a group to which each shielded second through-beam sensor belongs for the current vehicle in the length direction, and generating a detection value of the current vehicle in the length direction; and S3 of generating a rotation control instruction in accordance with a difference between the detection value of the current vehicle in the width direction and the predetermined detection value in the width direction as well as a difference between the detection value of the current vehicle in the length direction and the predetermined detection value in the length direction.

To be specific, the acquisition of the quantity of the shielded sensors in each through-beam sensor array and the group to which each shielded sensor belongs may refer to that mentioned in FIGS. 4-6, and thus will not be particularly defined herein. According to the positioning adjustment method in the embodiments of the present disclosure, it is able to provide the control instructions to the translation mechanism and the rotation mechanism, and maintain the vehicle at a same position and a same course angle before the calibration, thereby to solve the problem in the related art where the calibration accuracy is relatively low due to the inconsistency in the parking position and course angle.

The present disclosure further provides in some embodiments a positioning adjustment system which, as shown in FIG. 8, includes: a predetermined detection value acquisition unit 100 configured to acquire the quantity of shielded first through-beam sensors in a first through-beam sensor array and a group to which each shielded first through-beam sensor belongs when a vehicle is in an ideal state, generate a predetermined detection value in a width direction, acquire the quantity of shielded second through-beam sensors in a second through-beam sensor array and a group to which each shielded second through-beam sensor belongs when the vehicle is in the ideal state, and generate a predetermined detection value in a length direction; a detection value acquisition unit 200 configured to acquire the quantity of shielded first through-beam sensors in the first through-beam sensor array and a group to which each shielded first through-beam sensor belongs for a current vehicle in the width direction, generate a detection value of the current vehicle in the width direction, acquire the quantity of shielded second through-beam sensors in the second through-beam sensor array and a group to which each shielded second through-beam sensor belongs for the current vehicle in the length direction, and generate a detection value of the current vehicle in the length direction; and an instruction generation unit 300 configured to generate a translation control instruction in accordance with a difference between the detection value of the current vehicle in the width direction and the predetermined detection value in the width direction, and generate a rotation control instruction in accordance with the difference between the detection value of the current vehicle in the width direction and the predetermined detection value in the width direction as well as a difference between the detection value of the current vehicle in the length direction and the predetermined detection value in the length direction.

The acquisition of the quantity of the shielded sensors in each through-beam sensor array and the group to which each shielded sensor belongs may refer to that mentioned in FIGS. 4-6, and thus will not be particularly defined herein. According to the positioning adjustment system in the embodiments of the present disclosure, it is able to provide the control instructions to the translation mechanism and the rotation mechanism, and maintain the vehicle at a same position and a same course angle before the calibration, thereby to solve the problem in the related art where the calibration accuracy is relatively low due to the inconsistency in the parking position and course angle.

The present disclosure further provides in some embodiments a computer-readable storage medium storing therein one or more program instructions. The one or more program instructions are executed by a binocular camera depth calibration system so as to implement the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A vehicle positioning device for vehicle vision calibration, comprising:
   a base;
   a chassis on which a to-be-calibrated vehicle is placed, wherein the chassis is provided with a stopper configured to limit movement of the to-be-calibrated vehicle along a Y-axis direction in a three-dimensional coordinate system;
   a translation mechanism arranged between the chassis and the base and configured to drive the chassis to move along an X-axis direction in the three-dimensional coordinate system relative to the base in accordance with a translation control instruction;
   a rotation mechanism arranged between the chassis and the base and configured to drive the chassis to rotate about a Z-axis in the three-dimensional coordinate system relative to the base in accordance with a rotation control instruction;
   a first through-beam sensor array comprising two groups of first through-beam sensors arranged opposite to each other across the chassis along the X-axis direction, each group comprising a plurality of first through-beam sensors;
   a second through-beam sensor array comprising two groups of second through-beam sensors arranged opposite to each other across the chassis along the Y-axis direction, each group comprising a plurality of second through-beam sensors; and a general control unit configured to generate the translation control instruction in accordance with a shielding state of the first through-beam sensor array and to generate the rotation control instruction in accordance with the shielding state of the first through-beam sensor array and a shielding state of the second through-beam sensor array.

2. The vehicle positioning device according to claim 1, wherein the stopper is a limitation bar parallel to the X-axis direction.

3. The vehicle positioning device according to claim 1, wherein the rotation mechanism comprises:
   a rotary table, the translation mechanism being in transmission connection with the rotary table and configured to drive the chassis to rotate with the rotary table;
   a rotary stepping motor arranged between the rotary table and the base and configured to drive the rotary table to rotate the Z-axis in the three-dimensional coordinate system relative to the base in accordance with the rotation control instruction; and
   a spherical bearing rotatably mounted between the rotary table and the base and in transmission connection with the rotary stepping motor.

4. The vehicle positioning device according to claim 3, further comprising a lifting mechanism arranged between the rotary table and the translation mechanism, and the translation mechanism is in transmission connection with the rotary table through the lifting mechanism, wherein the lifting mechanism comprises: a lifting table on which the translation mechanism is mounted; and a telescopic cylinder, a first end of which is affixed to the lifting table, and a second end of which is affixed to the rotary table.

5. The vehicle positioning device according to claim 4, wherein the translation mechanism comprises: a bracket mounted on the lifting table; a screw rod, an axis of which is arranged along the X-axis direction and which is rotatably mounted on the bracket and driven by the rotatory stepping motor to rotate about its axis; and a nut in engagement with the screw rod and fixedly connected to the chassis.

6. The vehicle positioning device according to claim 5, wherein the translation mechanism further comprises: a straight guide rail arranged in the X-axis direction and affixed to the lifting table; and a slider slidably mounted on the straight guide rail in the X-axis direction and fixedly connected to the chassis.

7. A positioning adjustment method using the vehicle positioning system of claim 1, comprising:
   affixing a vehicle in on the chassis in the vehicle positioning system of;
   causing the chassis to move;
   acquiring the quantity of shielded first through-beam sensors in the first through-beam sensor array and a group to which each shielded first through-beam sensor belongs when a vehicle is in an ideal state, generating a predetermined detection value in a width direction, acquiring the quantity of shielded second through-beam sensors in the second through-beam sensor array and a group to which each shielded second through-beam sensor belongs when the vehicle is in the ideal state, and generating a predetermined detection value in a length direction;
   acquiring the quantity of shielded first through-beam sensors in the first through-beam sensor array and a group to which each shielded first through-beam sensor belongs for the vehicle in the width direction, generating a detection value of the vehicle in the width direction, acquiring the quantity of shielded second through-beam sensors in the second through-beam sensor array and a group to which each shielded second through-beam sensor belongs for the vehicle in the length direction, and generating a detection value of the vehicle in the length direction; and
   generating a rotation control instruction in accordance with a difference between the detection value of the vehicle in the width direction and the predetermined detection value in the width direction as well as a difference between the detection value of the vehicle in the length direction and the predetermined detection value in the length direction.

8. The positioning adjustment method according to claim 7, further comprising generating a translation control instruction in accordance with the difference between the detection value of the vehicle in the width direction and the predetermined detection value in the width direction.

* * * * *